Feb. 23, 1965     A. F. BOHNHOFF     3,170,336
BALL NUT AND SCREW ASSEMBLY
Filed Nov. 19, 1962
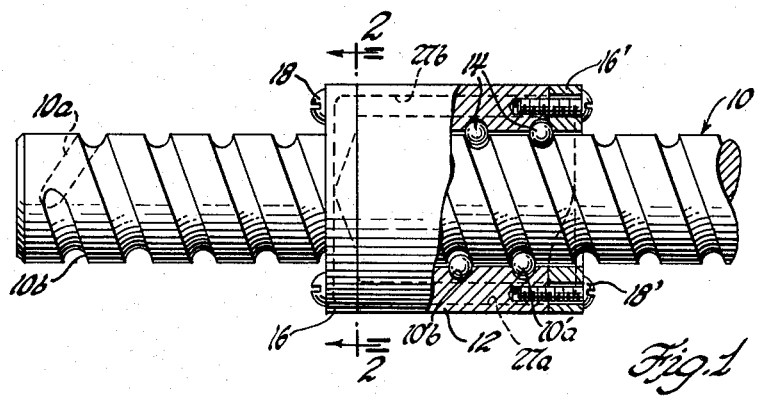
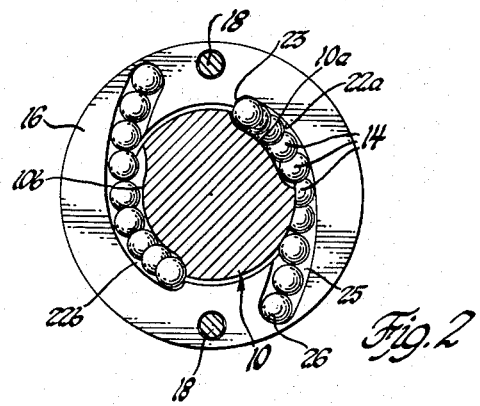
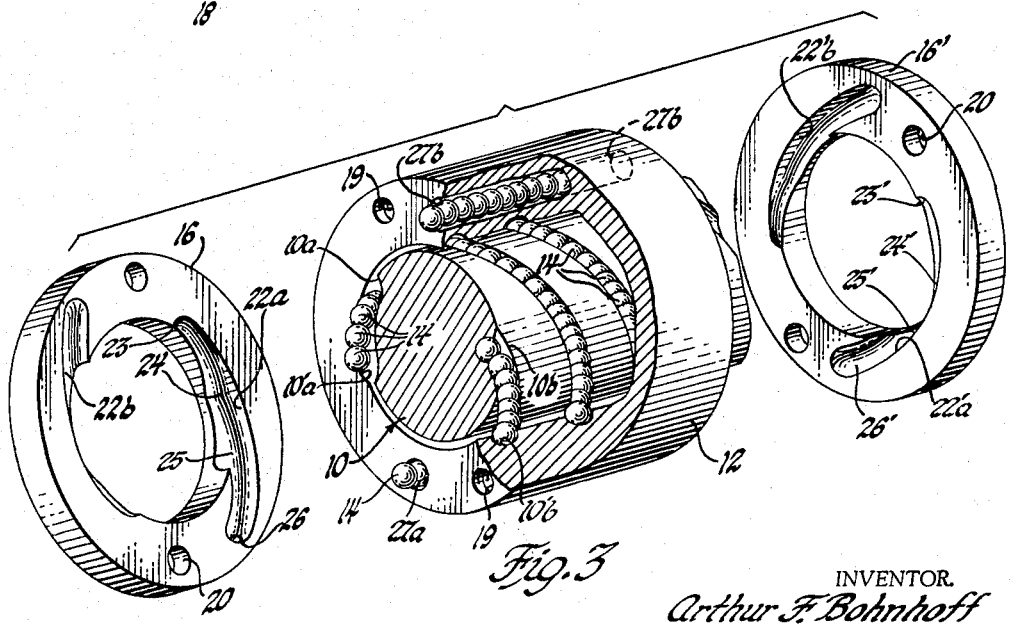
INVENTOR.
Arthur F. Bohnhoff
BY
A. M. Heiter
ATTORNEY

3,170,336
BALL NUT AND SCREW ASSEMBLY

Arthur F. Bohnhoff, Saginaw, Mich., assignor to General Motors Corporation, Detroit, Mich., a corporation of Delaware
Filed Nov. 19, 1962, Ser. No. 238,381
12 Claims. (Cl. 74—424.8)

This invention relates to a mechanical actautor and more particularly pertains to a ball nut and screw assembly having novel ball recirculating means.

Conventionally, in such assemblies the means for recirculating the balls comprises either a return tube member or ball return device secured to the nut having deflector fingers extending into the race formed by the helical groove of the screw and the complementary internal helical groove of the nut. These types of recirculating devices are freqeuntly undesirable in certain applications because of either the protuberance represented by the return tube or the performance characteristics attendant to the various deflector fingers. The return tube member or ball return device can further create a problem in situations where the load is high, yet the length of the nut must be restricted because of clearance restrictions. This fault derives from the fact that the apertures in the nut accommodating either the legs of the return tube member or the terminal ends of the ball return device must be located substantially inward of the ends of the nut so that the strength of the latter will not be impaired. As a consequence of this requirement, for any given length of the nut there are fewer balls carrying the load than would be the case if the return tube legs or ball return device could be situated in closer proximity to the ends of the nut.

With the foreging in mind, the present invention seeks to provide a ball nut and screw assembly having ball recirculating means arranged at each end of the nut. The present invention employs an end member secured to each end of the nut wherein each end member has provided in its inner face passageway means for ball travel between the race of the ball nut and screw assembly and a return passage in the nut. The passageway means is characterized in that it is formed by a recess which starts as a partial helical groove having a pitch diameter and lead corresponding to that of the helical groove of the nut and which in conjunction with a partial terminal portion of the nut defines a full helical groove. The partial helical groove in the end member progressively increases in width until it achieves a width sufficient to accommodate the full width of a ball and thereafter diverges from its former helical path to a path such that it forms a wall portion in the end member which coacts with a wall portion on the screw to gradually eject the balls. This latter path is preferably on a plane transverse of the axis of the nut. The recess gradually increases in depth as it progresses along this latter path until it achieves a depth sufficient to fully accommodate the rejected balls. Thereafter the recess continues to follow the tangential path until it axially aligns with the return passage in the nut at which point the recess turns in the direction of the axis of the nut to meet with the return passage. Conversely, the passageway means in the end member returns the balls from the return passage to the race by injecting the balls into the helical grooves of the screw and nut. It being appreciated that the present invention is applicable to a design having a plurality of nut and screw grooves in which case the end members would be provided with a corresponding number of recesses.

An object of the present invention is to provide in a ball nut and screw device, ball return means adjacent an end of the nut providing passageway means for ball travel to and from the race of the ball nut and screw device, said passageway means including a wall portion coacting with a wall portion of the screw to axially squeeze a ball to force the ball to move radially out of the helical groove of the screw and into said passageway means.

Another object of the present invention is to provide in a ball nut and screw device end members arranged adjacent each end of the nut having in their inner face passageway means providing a path for ball travel between the race of the ball nut and screw device and a return passage provided in the nut, said passageway means including a partial helical groove portion acting in conjunction with the helical groove of the screw to define a full helical groove, and a wall portion acting in conjunction with a wall portion on the screw to define a full ball receiving groove wherein said wall portions will coact to gradually eject the balls out of the helical groove of the screw and into said passageway means and to guide the balls from the return passage and inject the balls into the helical grooves of the screw and nut.

Another object of the present invention is to provide ball recirculating means in a nut end member comprising passageway means formed by a recess starting as a partial groove having a pitch diameter and lead corresponding to that of the helical groove of the nut and in conjunction with the helical groove of the nut defining a full helical groove, said partial groove progressively increasing in width until it achieves a width sufficient to fully accommodate the full width of a ball whereafter it follows a nonhelical path so that a wall portion formed thereby in conjunction with a wall portion on the screw defines a full ball receiving groove portion wherein said wall portions will coact to gradually eject the balls from the helical groove of the screw, said partial groove gradually increasing in depth as it progresses along said nonhelical path until it achieves a depth sufficient to fully accommodate a ball at which point the balls are fully ejected by said wall portions, whereafter the recess which is of sufficient width and depth to fully accommodate the ejected balls follows a direction to meet with said return passage.

Other objects of the invention will be apparent from the following description and the accompanying drawing which will be referred to as the description proceeds.

In the drawing:

FIGURE 1 illustrates an assembly conforming to the invention, both the screw and nut being shown broken away;

FIGURE 2 is a view on the line 2—2 in FIGURE 1; and

FIGURE 3 affords an exploded isometric view of the ball nut component, the body of which is shown broken away.

In FIGURE 1 the screw 10 is to be noted as having a pair of grooves 10a and 10b. Nut 12 carried on the screw is provided with a pair of complementary internal grooves 10'a and 10'b respectively. Balls 14 are disposed in the resulting race and provide the sole connection between the nut and screw.

At each end of the nut 12 is a return fixture 16, 16' secured to the body of the nut by means of screws 18, 18'. The nut body is provided with tapped holes 19 for the accommodation of the screws, these being in registry with apertures 20 in the fixtures. Each end member 16, 16' about its interface is provided with two grooves or recesses 22a, 22b, and 22'a, 22'b respectively wherein grooves 22a, 22'a cooperate with the grooves 10, 10'a and grooves 22b, 22'b cooperate with the grooves 10b, 10'b to provide passageways for ball travel. Each such groove or recess, such as groove 22a, starts at a point 23 as a partial helical groove having the same pitch diameter and lead as that of the internal helical groove 10'a in nut 12 and in conjunction with a partial terminal portion of the internal helical groove 10'a in nut 12 defines a full helical groove until it reaches a point 24. The balls 14 roll in the normal manner in the cooperating grooves 10a and 10'a in screw 10 and nut 12 respectively to the point 24. At this point 24, the groove 22a has a width to accommodate the full width of a ball and the normal depth keeping the balls in contact with a wall portion on screw 10 formed by the external helical groove 10a in screw 10. At this same point 24, the groove 22a diverges from its helical path to a path preferably on a transverse plane and continues to have the same width and a gradually increasing depth to define, in conjunction with the external helical groove 10a, a coacting full ball receiving walled portion until it reaches a point 25. As the balls move between points 24 and 25, they are axially squeezed by the side wall portion on screw 10 formed by the external helical groove 10a on the screw 10 and the wall of the groove 22a thus forcing the balls 14 to move radially out of the external helical groove 10a of screw 10. At this point 25, the partial groove achieves a depth sufficient to fully accommodate a ball which rests on top of the land on screw 10 between the screw grooves 10a and 10b and thence follows a tangential path of progressively increasing radius along the same aforementioned transverse plane until it reaches a point 26 where it finally turns in the axial direction to meet with the axial passage 27a formed in and paralleling the axis of the nut 12. The balls move along the passage 27a and eventually enter the groove 22'a in the end member 16' at 26'. The balls traverse the groove 22'a to the point 25' and thereafter are cammed into engagement with the external helical groove 10a on the screw by the groove 22'a between the points 25' and 24'. Between the points 24' and 23', the helical path of the groove 22'a maintains engagement of the balls with groove 10a of the screw until the balls make conjunctive engagement with the internal helical groove 10'a of the nut. A return passage 27b communicates the groove 22b in end member 16 with the groove 22'b in end member 16' in the same manner as return passage 27a communicates groove 22a with groove 22'a. While the balls have been described as exiting from the left end of the race and being returned to the right end of the race as viewed in FIGURE 3, a converse of operation results if the balls are caused to travel along the race from left to right because of the particular grooves provided in end members 16, 16'. By utilizing this kind of groove construction in the end members 16, 16' there is provided a ball passageway which positively gradually removes or ejects the balls from the loaded ball race, the balls being moved radially outwardly because of the relative camming action between the wall portion of the nonhelical groove in the end member 16 and the side wall portion on screw 10 formed by the external helical groove 10a on the screw 10. This occurs between the points 24 and 25. Thus it will be seen that that passage portion between the points 24 and 25 must diverge from the helical path of the grooves of the nut and screw gradually so that the balls are gradually ejected wherein the passage portion terminates at a point substantially on top of the land of the screw.

When the invention is applied to an assembly incorporating a nut and screw having only a single groove, it will be appreciated that each of the return fixtures 16, 16' requires only one return groove 22a, 22'a. It should be further appreciated that the invention is applicable to a design comprising a nut and screw having any suitable number of grooves in which case each return fixture is provided with a corresponding number of return grooves.

The above description is illustrative of the invention which, it will be appreciated, may be modified within the scope of the appended claims.

I claim:

1. In a ball nut device for a recirculating ball nut and screw assembly, a ball nut provided with a helical groove and a longitudinal return passage and a ball return device secured to one end of the ball nut for providing in conjunction with said one end of the ball nut passageway means between the helical groove of the ball nut and the longitudinal return passage, said passageway means including a terminal helical passage portion having the same helical pitch as the helical groove, an ejecting passage portion having a wall portion providing a cam surface of substantial length having a different pitch to diverge from the helical path by about half the width of said groove and an increasing depth to a point where the balls are fully accommodated within the ejecting passage portion and a generally radial portion connected to said longitudinal return passage and another ball return device secured to the ball nut at a point spaced from said one end of the ball nut providing a ball passageway between the helical groove of the ball nut and the longitudinal return passage.

2. A nut and screw device comprising, a nut having a longitudinal return passage and an internal helical groove, a screw having an external helical groove, said helical grooves mating with each other to provide a race, a train of balls mounted in said race providing a driving connection between said nut and screw, a return member arranged adjacent one end of the nut providing in conjunction with said one end of the nut passageway means between said race and longitudinal return passage, said passageway means including a side wall portion providing a cam surface of substantial length which coacts with a side wall portion on the screw formed by the external helical groove of the screw to provide a camming action for moving the balls radially out of the external helical groove of the screw and into said passageway means and ball return means secured to the nut providing a ball passageway connecting said race and longitudinal return passage at a point on said nut longitudinally spaced from said one end of the nut.

3. A nut and screw device comprising, a nut having a longitudinal return passage and an internal helical groove, a screw having an external helical groove, said helical grooves mating with each other to define a race, a train of balls mounted in said race providing a driving connection between said nut and screw, a return member arranged adjacent both ends of the nut providing passageway means between said race and longitudinal return passage, each said pasasgeway means including a side wall portion providing a cam surface of substantial length which coacts upon relative movement between the nut and screw with a side wall portion on the screw formed by the external helical groove of the screw to axially squeeze a ball to force the ball to move radially out of the external helical groove of the screw and into said passageway means.

4. A nut and screw device comprising, a nut having a longitudinal return passage and an internal helical groove, a screw having an external helical groove, said helical grooves mating with each other to define a race, a train of balls mounted in said race providing a driving connection between said nut and screw, a return member arranged adjacent one end of the nut providing passageway means for ball travel between said race and longitudinal return passage, said passageway means being defined by a wall formed by a recess in said return member starting as a partial groove having a pitch diameter and lead corresponding to that of the internal helical groove of the nut and in conjunction with the internal helical groove of the nut defining a full helical groove, said partial groove progressively increasing in width until it achieves a width sufficient to fully accommodate the full width of a ball whereafter it follows a nonhelical path such that a wall portion formed thereby in said return member in conjunction with a side wall portion on the screw formed by the external helical groove of the screw defines a full ball receiving groove portion and wherein said wall portions coact to gradually eject the balls out of the external helical groove of the screw and into said recess, said partial groove gradually increasing in depth as it progresses along said nonhelical path until it achieves a depth sufficient to fully accommodate a ball at which point the balls are fully ejected by said wall portions, whereafter the recess which is of sufficient width and depth to fully accommodate the ejected balls follows a direction to meet with said longitudinal return passage and ball return means secured to the nut at a point spaced from said one end of the nut providing another passageway means for ball travel between said race and longitudinal return passage.

5. A nut and screw device comprising, a nut having a longitudinal return passage and an internal helical groove, a screw having an external helical groove, said helical grooves mating with each other to provide a race, a train of balls mounted in said race providing a driving connection between said nut and screw, a return member arranged adjacent one end of the nut providing passageway means for ball travel between said race and longitudinal return passage, said passageway means being defined by a wall formed by a recess in said return member starting as a partial groove having a pitch diameter and lead corresponding to that of the internal helical groove of the nut and in conjunction with the internal helical groove of the nut defining a full helical groove, said partial groove progressively increasing in width until it achieves a width sufficient to fully accommodate the full width of a ball whereafter it diverges from its helical direction to a direction such that a wall portion formed thereby in said return member in conjunction with a side wall portion on the screw formed by the external helical groove of the screw defines a full ball receiving groove portion and wherein said wall portions coact to gradually eject the balls out of the external helical groove of the screw and into said recess, said partial groove gradually increasing in depth as it progresses along the latter direction until it achieves a depth sufficient to fully accommodate a ball at which point the balls are fully ejected by said wall portions, whereafter the recess follows a direction to meet with said return passage and ball return means secured to said nut providing a passageway for ball travel between said race and longitudinal return passage at a point longitudinally spaced from said one end of the nut.

6. A nut and screw device comprising, a nut having a longitudinal return passage and an internal helical groove, a screw having an external helical groove, said helical grooves mating with each other to provide a race, a train of balls mounted in said race providing a driving connection between said nut and screw, a return member arranged adjacent one end of the nut providing passageway means for ball travel between said race and longitudinal return passage, said passageway means being defined by a wall formed by a recess in said return member starting as a partial groove having a pitch diameter and lead corresponding to that of the internal helical groove of the nut and in conjunction with the internal helical groove of the nut defining a full helical groove, said partial groove progressively increasing in width until it achieves a width sufficient to fully accommodate the full width of a ball whereafter it diverges from its helical direction to a direction transverse to the axis of the nut and in conjunction with a side wall portion on the screw formed by the etxernal helical groove of the screw defines a full ball receiving groove portion and wherein said wall portions coact to gradually eject the balls out of the external helical groove of the screw and into said recess, said partial groove gradually increasing in depth as it progresses along said transverse direction until it achieves a depth sufficient to fully accommodate a ball at which point the balls are fully ejected by said wall portions, whereafter said recess follows a direction to meet with said return passage and a ball return device secured to the nut providing another passageway means for ball travel between said race and longitudinal return passage longitudinally spaced from said one end of the nut.

7. A nut and screw device comprising, a nut having a longitudinal return passage and an internal helical groove, a screw having an external helical groove, said helical grooves mating with each other to provide a race, a train of balls mounted in said race providing a driving connection between said nut and screw, a return member arranged adjacent both ends of the nut providing passageway means for ball travel between said race and longitudinal return passage, said passageway means being defined by a wall formed by a recess in said return member starting as a partial groove having a pitch diameter and lead corresponding to that of the internal helical groove of the nut and in conjunction with the internal helical groove of the nut defining a full helical groove, said partial groove increasing in width until it achieves a width sufficient to fully accommodate the full width of a ball whereafter it diverges from its helical direction to a direction such that a wall portion formed thereby in said return member in conjunction with a side wall portion on the screw formed by the external helical groove of the screw defines a full ball receiving groove portion and wherein said wall portions coact to gradually eject the balls out of the external helical groove of the screw and into said recesses, said partial groove gradually increasing in depth as it progresses along the latter direction until it achieves a depth sufficient to fully accommodate a ball which rests on top of a land of the screw formed by the external helical groove of the screw at which point the balls are fully ejected by said wall portions, whereafter the recess which is of sufficient width and depth to fully accommodate the ejected balls follows a direction to meet with said return passage.

8. A nut and screw device comprising, a nut having a longitudinal return passage and an internal helical groove, a screw having an external helical groove, said helical grooves mating with each other to provide a race, a train of balls mounted in said race providing a driving connection between said nut and screw, a return member arranged adjacent both ends of the nut providing passageway means for ball travel between said race and longitudinal return passage, said passageway means being defined by a wall formed by a recess in said return member starting as a partial groove having a pitch diameter and lead corresponding to that of the internal helical groove of the nut and in conjunction with the internal helical groove of the nut defining a full helical groove, said partial groove progressively increasing in width until it achieves a width sufficient to fully accommodate the full width of a ball whereafter it diverges from its helical direction to a direction substantially transverse to the axis of the nut and in conjunction with a side wall portion on the screw formed by the external helical groove of the screw defines a full ball receiving groove portion and wherein said wall portions coact to gradually eject the balls out of the helical groove of the screw and into said recess, said partial groove gradually increasing in depth as it progresses along the latter direction until it achieves a depth sufficient to fully accommodate a ball which rests on top of a land on the screw formed by the external helical groove of the screw at which point the balls are fully ejected by said wall portions, whereafter the recess which is of sufficient width and depth to fully accommodate the ejected balls follows a direction to meet with said return passage.

9. A nut and screw device comprising, a nut having a longitudinal return passage and an internal helical groove, a screw having an external helical groove, said helical grooves mating with each other to provide a race, a train of balls mounted in said race providing a driving connection between said nut and screw, an end member arranged adjacent both ends of said nut having in its inner face a wall providing a passageway for ball travel between said race and longitudinal return passage, said wall being formed by a recess starting as a partial groove having a helical direction and lead corresponding to that of the internal helical groove of the nut and in conjunction with the internal helical groove of the nut defining a full helical groove so that the wall formed in said end member by said partial groove cooperates with a side wall on the nut formed by the internal helical groove of the nut to define a full helical groove, said partial groove progressively increasing in width until it achieves a width to accommodate the full width of a ball, whereafter said partial groove diverges from its helical path and gradually increases in depth such that a wall portion formed in said end member by said partial groove in conjunction with a side wall on the screw formed by the external helical groove of said screw defines a coacting wall portion until said partial groove achieves a width sufficient to fully accommodate a ball so that a ball in said coacting walled portion is axially squeezed thereby upon relative movement between the nut and screw to force the ball to move radially out of the helical groove of said screw and into said recess, whereafter said recess follows a direction to meet with said return passage.

10. A nut and screw device comprising, a nut having a longitudinal return passage and an internal helical groove, a screw having an external helical groove, said helical grooves mating with each other to provide a race, a train of balls mounted in said race providing a driving connection between said nut and screw, an end member readily detachably secured to either end of the nut having in its inner face a wall providing a path for ball travel between said race and return passage, said wall in the end member being formed by a recess starting as a partial groove having the same pitch diameter and lead as that of the internal helical groove of the nut and in conjunction with the internal helical groove of the nut defining a full helical groove so that the wall formed by said partial groove in said end member cooperates with a side wall on the nut formed by the internal helical groove of the nut to define a full helical groove, said partial groove progressively increasing in width until it achieves a width sufficient to accommodate the full width of a ball, whereafter said partial groove diverges from its helical path to a path on a plane transverse to the axis of the nut and gradually increases in depth so that a wall portion formed thereby in the wall in said end member provides in conjunction with a side wall on the screw formed by the external helical groove of the screw a coacting walled portion capable of receiving a full ball, said coacting walled portion coacting to move the balls radially out of the external helical groove of the screw and into said partial groove upon relative movement between the nut and screw, said partial groove gradually increasing in depth as it progresses along said transverse plane until it achieves a depth sufficient to fully accommodate a ball which rests on top of a land on the screw formed by the external helical groove of the screw at which point the balls are fully ejected by said coacting walled portion, whereafter the recess continues on said transverse plane until it reaches a point at which it turns in the direction of the axis of the nut to meet with the return passage in the nut.

11. A nut and screw device comprising, a nut having a pair of internal helical grooves, a screw having a pair of external helical grooves, said pairs of helical grooves mating with each other to provide a pair of races, a longitudinal return passage in said nut corresponding to each of said races, an end member readily detachably secured to either end of the nut having in its inner face a pair of walls wherein each of said walls provides a path for ball travel between each of said races and their corresponding longitudinal return passages, each said wall being formed by a recess starting as a partial groove having the same pitch diameter and lead as that of one of the internal helical grooves of the nut and in conjunction with said one internal helical groove defining a full helical groove so that the wall formed by said partial groove in said end member cooperates with a side wall on the nut formed by said one internal helical groove of the nut to define a full helical groove, said partial groove progressively increasing in width until it achieves a width sufficient to accommodate the full width of a ball, whereafter said partial groove diverges from its helical path to a path on a plane transverse to the axis of the nut and gradually increases in depth so that a wall portion formed thereby in said end member provides in conjunction with a side wall on the screw formed by one of the external helical grooves of the screw a coacting walled portion capable of receiving a full ball, said coacting walled portion coacting to move the balls radially out of said one external helical groove of the screw and into said partial groove upon relative movement between the nut and screw, said partial groove gradually increasing in depth as it progresses along said transverse plane until it achieves a depth sufficient to accommodate a ball which rests on top of a land on the screw formed by the external helical grooves of the screw at which point the balls are fully ejected by said coacting walled portion, whereafter the recess continues on said transverse plane until it reaches a point at which it turns in the direction of the axis of the nut to meet with the longitudinal return passage corresponding to the race provided by said one internal helical groove of the nut and said one external helical groove of the screw.

12. A nut and screw device comprising, a nut having a plurality of internal helical grooves, a screw having a number of external helical grooves corresponding to the number of internal helical grooves in the nut, said helical grooves of said nut and screw mating with each other to provide a plurality of races, a longitudinal return passage in said nut corresponding to each of said races, an end member readily detachably secured to either end of the nut having in its inner face a plurality of walls wherein each of said walls provides a path for ball travel between each of said races and their corresponding longitudinal return passages, each said wall being formed by a recess starting as a partial groove having the same pitch diameter and lead as that of one of the internal helical grooves of the nut and in conjunction with said one internal helical groove defining a full helical groove so that the wall formed by said partial groove in said end member cooperates with a side wall on the nut formed by said one internal helical groove of the nut to define a full helical groove, said partial groove progressively increasing in width until it achieves a width sufficient to accommodate the full width of a ball, whereafter said partial groove diverges from its helical path to a path on a plane transverse to the axis of the nut and gradually increases in depth so that a wall portion formed thereby in said end member provides in conjunction with a side wall on the screw formed by one of the external helical grooves of the screw a coacting walled portion capable of receiving a full ball, said coacting walled portion coacting to move the balls radially out of said one external helical groove of the screw and into said partial groove upon relative movement between the nut and screw, said partial groove gradually increasing in depth as it progresses along said transverse plane until it achieves a depth sufficient to accommodate a ball which rests on top of a land on the screw formed by the external helical grooves of the screw at which point the balls are fully ejected by said coacting walled portion, whereafter the recess continues on said transverse plane until it reaches a point at which it turns in the direction of the axis of the nut to meet with the longitudinal return passage corresponding to the race provided by said one internal helical groove of the nut and said one external helical groove of the screw.

References Cited in the file of this patent
UNITED STATES PATENTS

| | | |
|---|---|---|
| 2,166,106 | Gormley | July 18, 1939 |
| 2,724,284 | Anderson et al. | Nov. 22, 1955 |
| 3,053,105 | Cole | Sept. 11, 1962 |